United States Patent
Wu et al.

(10) Patent No.: US 7,245,441 B2
(45) Date of Patent: Jul. 17, 2007

(54) DOCUMENT CAMERA HAVING ZOOM-INDICATION FUNCTION

(75) Inventors: Jiun-Shin Wu, Taipei (TW); Jung-Yu Chen, Taipei (TW); Yung-Hsi Wu, Taipei (TW); Po-Chih Hung, Taipei (TW)

(73) Assignee: Avermedia Technologies, Inc. (TW)

( * ) Notice: Subject to any disclaimer, the term of this patent is extended or adjusted under 35 U.S.C. 154(b) by 0 days.

(21) Appl. No.: 11/238,752

(22) Filed: Sep. 29, 2005

(65) Prior Publication Data
US 2006/0274428 A1    Dec. 7, 2006

(30) Foreign Application Priority Data
Jun. 2, 2005    (TW) ................... 94118250

(51) Int. Cl.
*G02B 15/14*    (2006.01)
*H04N 5/225*    (2006.01)
*G03B 19/00*    (2006.01)

(52) U.S. Cl. .............. 359/676; 348/207.1; 348/207.11; 396/430

(58) Field of Classification Search ................ 359/676; 348/207.1, 207.11; 396/430
See application file for complete search history.

(56) References Cited

U.S. PATENT DOCUMENTS
2004/0223058 A1 * 11/2004 Richter et al. ........... 348/207.1

* cited by examiner

*Primary Examiner*—Ricky Mack
*Assistant Examiner*—William Choi

(57) ABSTRACT

A document camera is used to show image of an object on a display. In the document camera, a first image data of the object obtained by a video-capturing device is derived into a second image data and a third image data by an image processor in response to a zoom operation, wherein the second image data results in a zoomed image of the object and the third image data results in a scaled image of the object. In response to the zoom operation, there is also a mark frame data generated by a position information controller, which results in a mark frame. The zoomed image, scaled image and mark frame are then synthesized into a combined image by an image synthesizer, and the mark frame superimposes the scaled image to indicate a result of the zoom operation.

9 Claims, 5 Drawing Sheets

DOCUMENT CAMERA HAVING ZOOM-INDICATION FUNCTION

FIELD OF THE INVENTION

The present invention relates to a document camera, and more particularly to a document camera used with an image display to show an object with zoom indication.

BACKGROUND OF THE INVENTION

Multimedia processing technology is very widely applied to electronic products in the market, such as PDAs (Personal Digital Assistants), cellular phones, digital cameras, high-definition digital TVs and document cameras. For implementing the multimedia processing technology, DSP (Digital Signal Processor) is commonly used in these electronic products.

The DSP is advantageous of processing a large number of input digital signals at one time, and quickly executing operations to reach the Real-Time performance. The special DSP hardware and command designs facilitate the accomplishment of complicated control and various additional functions required by respective electronic products. Unlike the traditional microprocessor, the DSP has improved command execution speed, performance and Real-Time performance, so the DSP plays an important role on multimedia processing technology.

Taking a document camera as an example, it is popularly used in a regular meeting or an academic conference to show some literal or graphical data in order to facilitate the presentation or discussion of a document, chart or academic thesis. Compared with the traditional transparency projectors, the document cameras not only exhibit better image quality and versatile functions but also easier in preparing material to be shown. For example, the documents or charts do not have to be printed on the transparent projection slices as they used to do with the traditional transparency projector. Furthermore, a document camera is generally more compact is size than a traditional transparency projector and thus is inconvenient for carrying and storing.

A document camera is typically incorporated therein the architecture of a scanner or a video camera for performing digital image scanning, image capturing, and image outputting functions. So, a document camera may be equipped with a video-capturing module generally used in a digital still camera, digital video camera or cellular phone to execute the image pickup function. An image sensor, which is implemented with a complementary metal-oxide-semiconductor sensor (CMOS sensor) or a Charge Couple Device (CCD), is used in the video-capturing module to pick up the image of an object positioned in front of the video-capturing module, and an image display is used with the document camera for showing the image of the object captured by the image sensor. For example, the image display can be a monitor of a TV set, a display of a computer system or a projection screen showing images via the protection of a digital projector. In this way, the document or chart can be displayed in a live video manner. Also, the utilization of a document camera vivifies the presentation due to its functional varieties. Therefore, a document camera is expected to replace the traditional transparency projector in near future.

Please refer to the example shown in FIG. 1(a). A document camera 10 is coupled to a digital projector 20 and a projection screen 21 is arranged a proper distance from the digital projector 20. The image of the object 1 captured by a video-capturing module 11 is processed by the document camera 10 and then outputted to the digital projector 20 to be shown on the projection screen 21. By placing the object in of the focusable range of the video-capturing module 11, the document camera 10 will be able to process the image of object 1 and show it as a live video on the projection screen 21 via the digital projector 20. In addition to showing images via the digital projector 20 and the projection screen 21, the images captured by the document camera 10 can also be shown on an image display directly coupled to the document camera 10, such as a monitor of a TV set or a display of a computer system. For most document cameras, there is a focus adjusting device (not shown) arranged in the video-capturing module 11 for manually zooming in or zooming out the object 1 to focus on a specific area that the user is interested in.

Please refer to FIG. 1 (b). It shows a functional block diagram of the document camera 10. Conventionally, the document camera 10 includes a video-capturing module 101, a digital signal processor (DSP) 102 and a digital-to-analog converter (DAC) 103. The video-capturing module 101 includes an image-sensor 1011 and an analog-to-digital converter (ADC) 1012. In the image sensor 1011, the received light intensity from an object is converted into corresponding amount of charges through photoelectrical conversion and then outputted as an analog signal. The analog signal is then converted into a digital image data by the ADC 1012 and transmitted to the DSP 102 for further processing, e.g. zoom-in or zoom-out operations of the digital image data. Afterwards, the DAC 103 converts the processed digital image data into an analog image data and outputs it to an image display 104 for display.

Although zoom-in and zoom-out operations have been feasible in conventional document cameras, only a specific area of the object is shown the image display after the zoom-in or zoom-out operation. However, it is usually hard to figure out the position of the shown specific area relative to the full size image after a zoom-in operation. Particularly, the higher the zoom-in ratio is, the less recognizable the image becomes. Under this circumstance, the user generally needs to zoom in and out the image several times to locate the specific area in order to well perform a pan operation subsequently. It is apparently a time-wasting and inconvenient task for the user.

SUMMARY OF THE INVENTION

Therefore, one object of the present invention is to design a document camera having a zoom-indication function so that the user can locate the zoom-in area of the object readily.

The present invention provides a document camera for showing image of an object on an image display. In the document camera, a video-capturing device is used for picking up an initial image of the object to realize a first image data. An image processor is electrically connected to the video-capturing device for deriving a second image data and a third image data from the first image data in response to a zoom operation, wherein the second image data results in a zoomed image of the object and the third image data results in a scaled image of the object. A position information controller is electrically connected to the image processor for generating a mark frame data in response to the zoom operation, wherein the mark frame data results in a mark frame. An image synthesizer is electrically connected to the position information controller and the image processor for synthesizing the zoomed image, the scaled image and the mark frame to generate a combined image shown on the image display, wherein the mark frame superimposes the scaled image to indicate a result of the zoom operation.

In an embodiment, the video-capturing device is a module incorporating therein an image sensor for receiving and converting a light intensity reflected from the object into an analog signal, and an analog-to-digital converter for converting the analog signal into the first image data.

The first image data, the second image data, the third image data and the mark frame data preferably include coordinates of respective start points on the image display.

Optionally, the scaled image overlays a corner of the zoomed image, and the mark frame preferably variably superimposes the scaled image according to the relationship between the zoomed image and the initial image.

For example, the zoom operation is a zoom-in operation, the second image data is obtained according to a specified zoom-in ratio n, the third image data is obtained according to a specified contraction ratio m, and the mark frame data is obtained according to the specified zoom-in ratio n and the specified contraction ratio m. Specifically, the mark frame data includes position information and size information correlating to the product m×n.

In an embodiment, the document camera further comprises a digital-to-analog converter electrically connected to the image synthesizer for converting the combined image data into an analog image data for display.

The image processor, the position information controller and the image synthesizer can be integrated into a single chip.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1A:
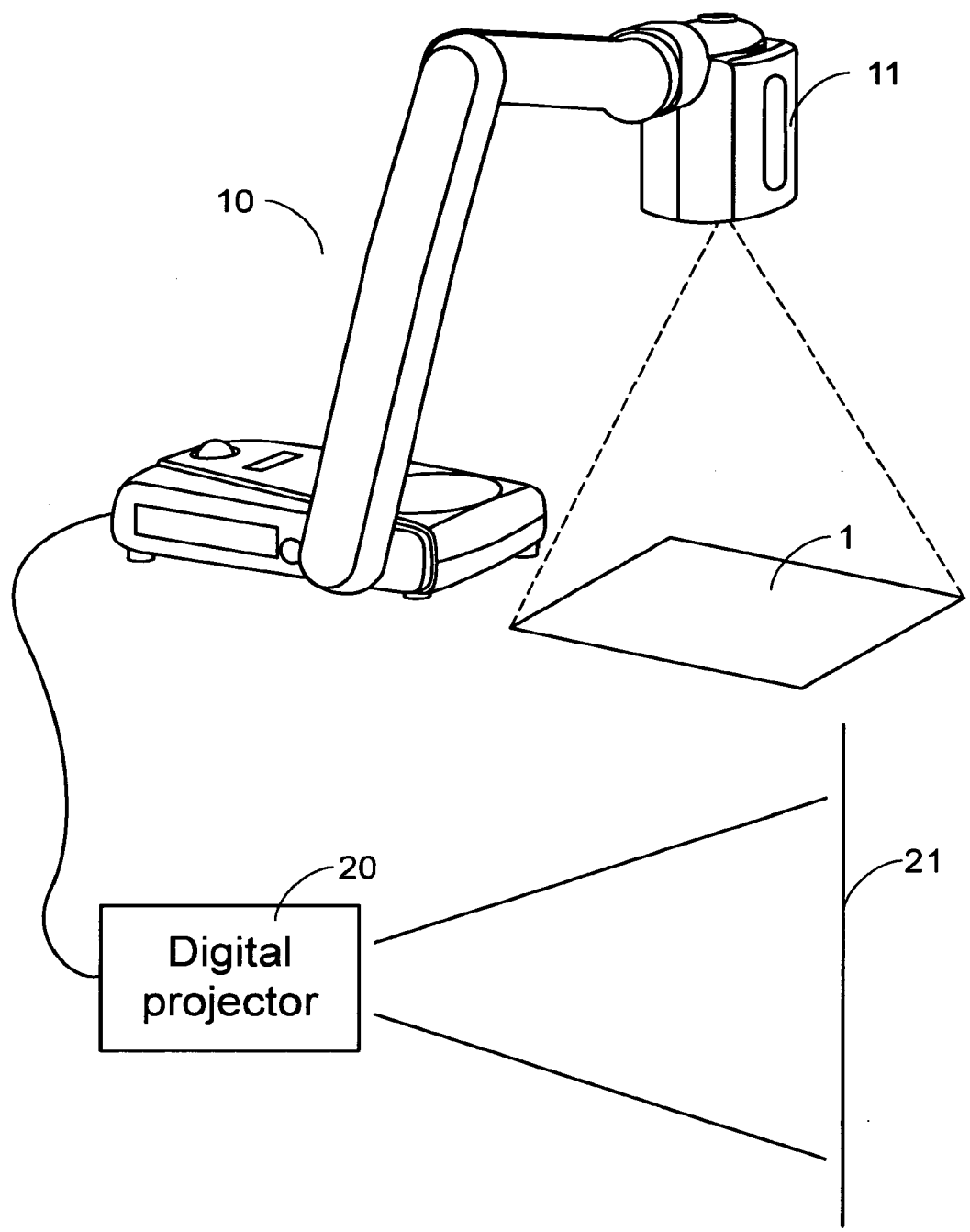
FIG. 1(a) is a schematic diagram illustrating a typical document camera for use with a digital projector and an image display.
Figure 1B:
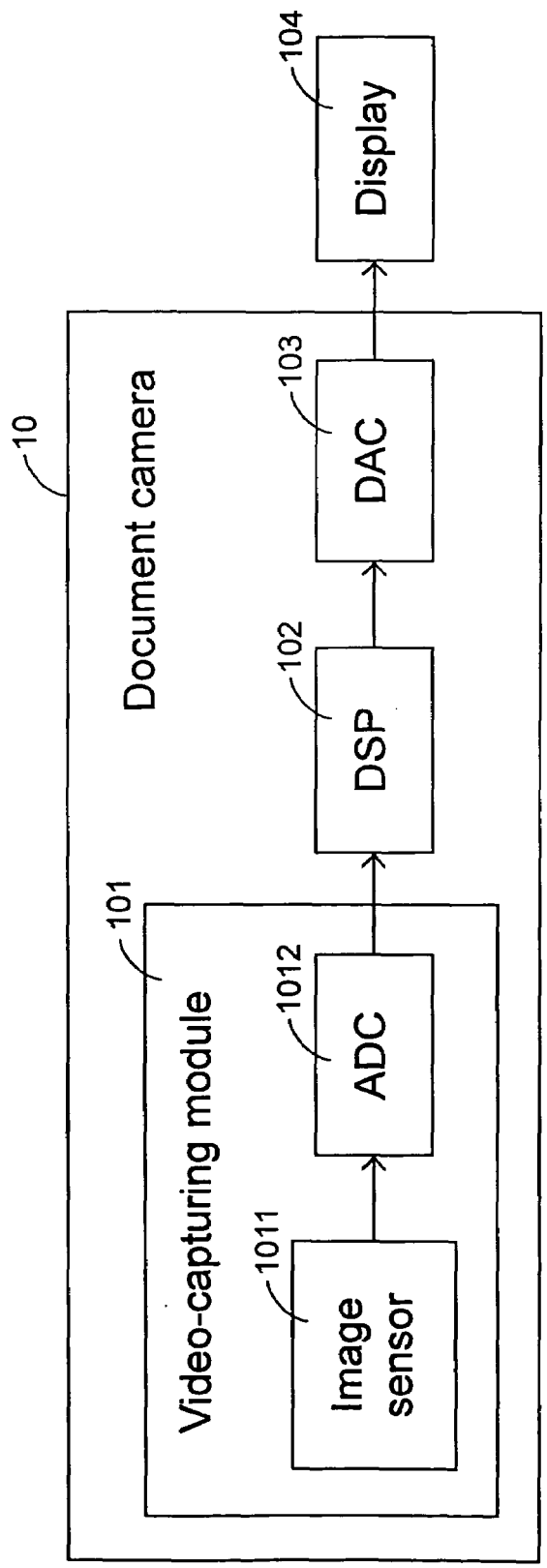
FIG. 1(b) is a functional block diagram illustrating a conventional document camera.
Figure 2:
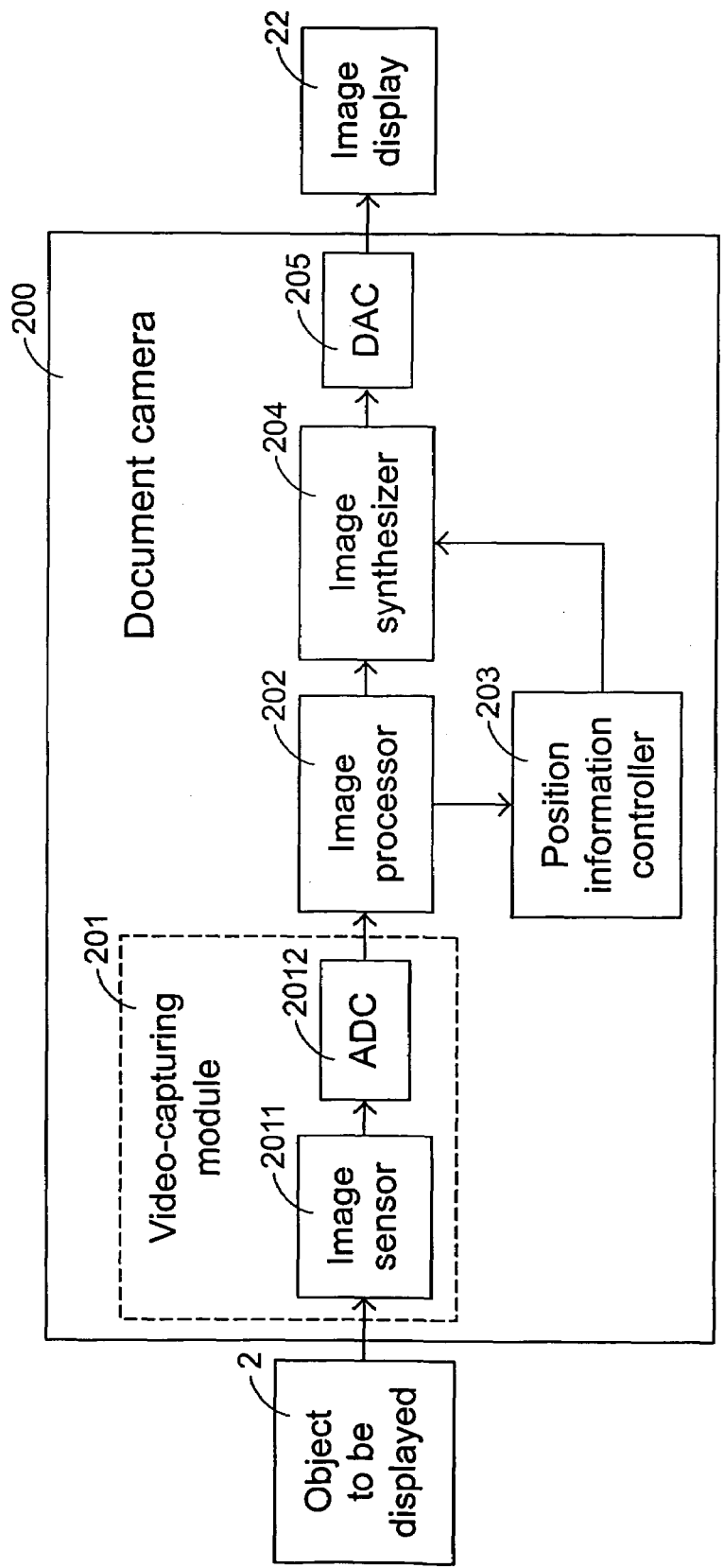
FIG. 2 is a functional block diagram of a document camera according to a first embodiment of the present invention.

For imparting a zoom-indication function to a document camera, a position information controller and an image synthesizer are arranged in the document camera to locate the zoomed area according to the present invention. Please refer to FIG. 2 which illustrates a first embodiment of the document camera with zoom indication. The document camera 200 is used to show an object 2 on an image display 22. For example, the object 2 may be a paper document of general size, and the image display 22 may be a monitor of a TV set, a display of a computer system or a projection screen with the aid of a digital projector (refer to FIG. 1(a)).

In this embodiment, the document camera 200 includes a video-capturing module 201, an image processor 202, a position information controller 203 and an image synthesizer 204. The video-capturing module 201 includes an image sensor 2011 and an analog-to-digital converter (ADC) 2012. For example, the image sensor 2011 is constructed by a Charge Couple Device (CCD) or a complementary metal-oxide-semiconductor sensor (CMOS sensor). The image sensor 2011 converts the light intensity reflected and received from the object 2 into an analog signal and then outputs the analog signal to the ADC 2012 to be converted into a digital image data to be shown on the image display 22.

The image processor 202 of the document camera 200 is electrically connected to the video-capturing module 201 for processing the digital image data when necessary. For example, when the user manipulates the operational interface, e.g. a control panel or remote controller (not shown) of the document camera 200, to do a zoom-in operation, the zoom-in information including the zoom-in ratio and the starting point of the zoomed area as well as the digital image data will be referred to by the image processor 202 in order to show a specific area of the object 2 in an enlarged manner. According to the present invention, in addition to the enlarged image of the specific area of the object 2, a contracted image of the object 2 for zoom indication is also created by the image processor 202 to be shown on the image display 22 along with the enlarged image of the specific area of the object 2. This purpose is achieved by the image synthesizer 204.

Figure 3:
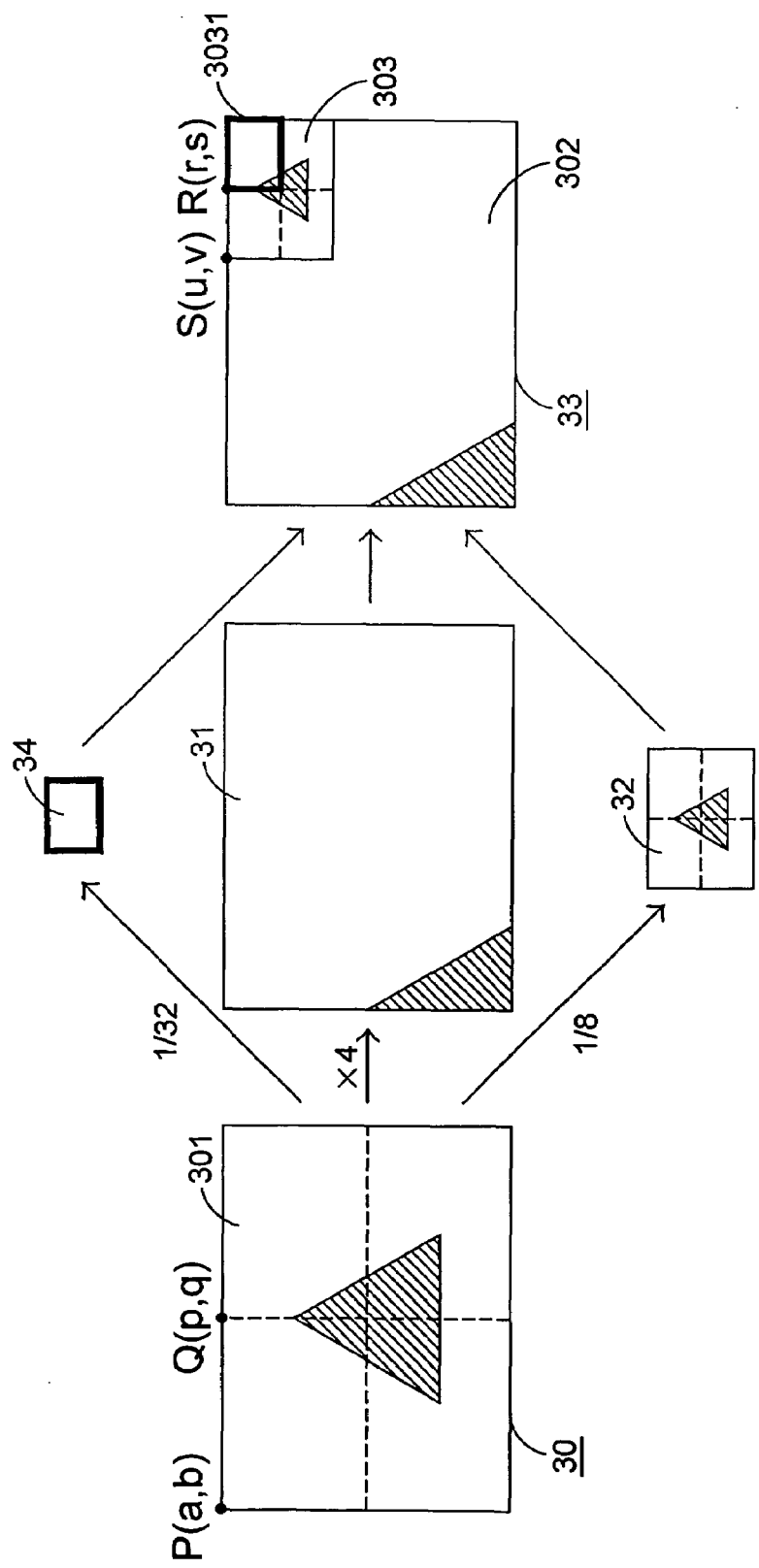
FIG. 3 is a scheme exemplifying the image change accomplished by the document camera of FIG. 2 after a zoom-in operation.

The image synthesizer 204 is electrically connected to the image processor 202 for combining the image data of the enlarged image 31 and the contracted image 32, as illustrated in the scheme of FIG. 3. Moreover, for indicating which part of the full size image 30 of the object 2 has been zoomed in and shown as the main frame 31, a mark frame 34 is further created by the position information controller 203. Being processed by the image synthesizer 204, the synthesized image 33 consists of a main frame 302 equivalent to the image 31, an overlay image 303 equivalent to the image 32 and another overlay image equivalent 3031 to the mark frame 34. The mark frame image 3031 is marked on the contracted overlay image 303 to show the zoomed part of the image 30 so that the user can well realize the result of the zoom operation and thus can do any subsequent pan operation properly. As the synthesized image data resulting from the image synthesizer 204 is in a digital format, a digital-to-analog converter (DAC) 205 is provided in the document camera 200 to convert the resulting image data into an analog image data suitable to be shown on the image display 22. The position information controller 203 for creating the mark frame 34 is electrically connected to the image processor 202 and the image synthesizer 204. The mark frame 34 is created according to the information of the zoom-in ratio, the starting point of the zoomed area 301 and the contraction ratio of the overlay image 32. An example for illustrating the synthesis of these images 31, 32 and 34 will be described hereinafter.

In this example, the coordinates of the start point P(a,b) of the full size image 30 obtained by the video-capturing module 201 is set to be P(1,1) and the image 30 includes 800×600 pixels. Then, it is assumed that the coordinates of the starting point Q(p,q) of the zoomed area 301 are Q(401, 1), the zoom-in ratio n from the image portion 301 to the image 31 is 4, and the contraction ratio m from the image 30 to the image 32 is 8. Accordingly, the zoom indication overlay image 303 occupies ⅛ of the displayed image 33 and the mark frame 3031 occupies ⅟₃₂ of the image 33. The coordinates of the starting point S(u,v) of the zoom indication overlay image 303 are S(800−800/(8)$^{1/2}$,1), and the coordinates of the starting point of the starting point R(r,s) of the mark frame 3031 are R(800−800/(32)$^{1/2}$,1). According to the above information, not only the zoomed image can be shown but also which part of the full size image 30 of the object 2 is zoomed in can be illustrated. The scaling ratio of the zoom indication overlay image 303 may be preset. Under this circumstance, the coordinates of the starting point S(u,v) of the zoom indication overlay image 303 will be fixed at S(800−800/(8)$^{1/2}$,1) without change with the zooming ratio, and only the position and the size of the mark frame 3031 vary with the zoom ratio. Furthermore, when the user digitally pans, zooms in or zooms out the image to another specific area via the operation interface, the position of the mark frame 3031 relative to the contracted image 303 can be used to clearly show the current displaying status of the object 2 for the user's reference.

Figure 4:
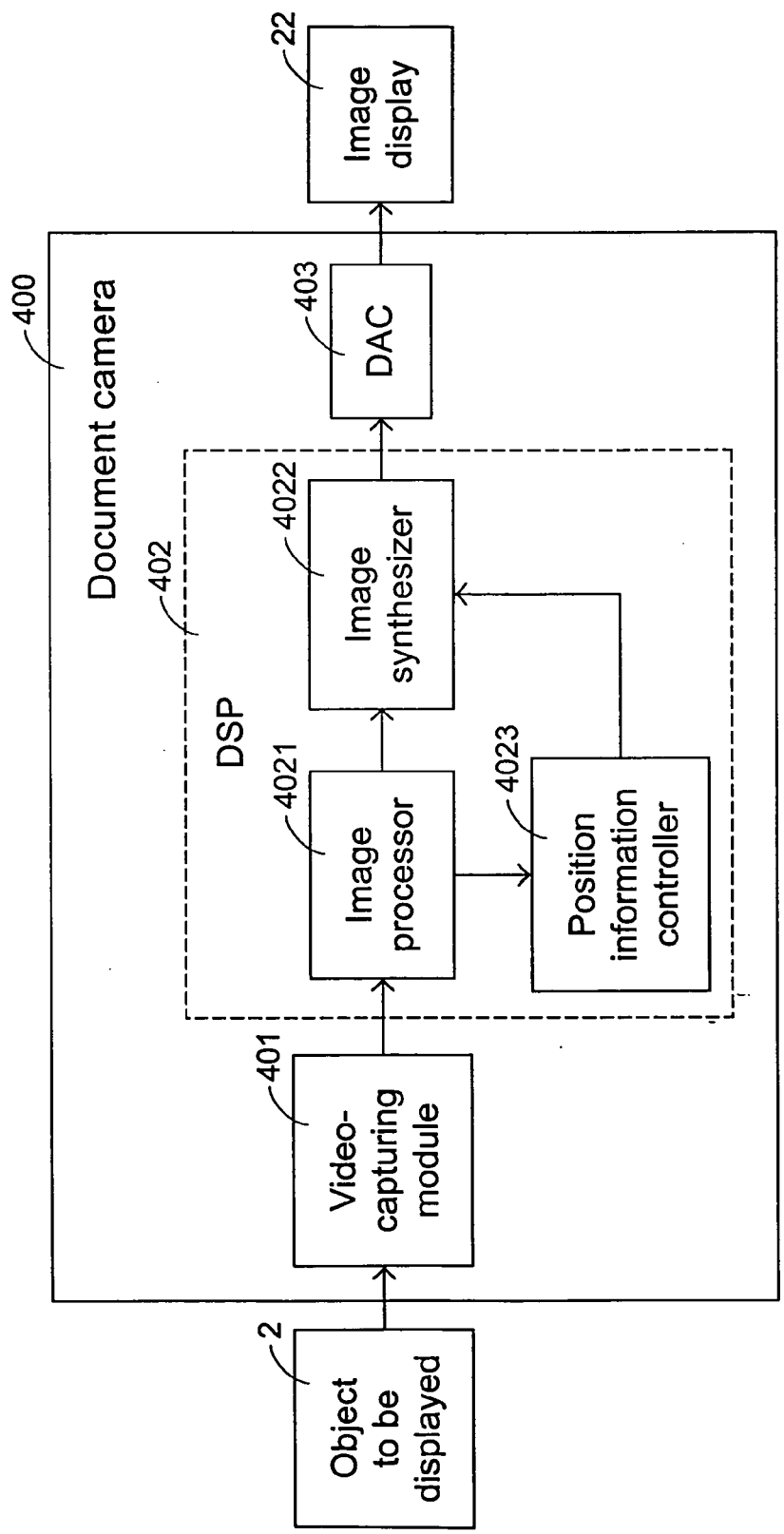
FIG. 4 is a functional block diagram of a document camera according to a second embodiment of the present invention.

Please refer to FIG. 4, in which a functional block diagram of a document camera 400 according to a second embodiment of the present invention is shown. The document camera can also be used to show the object 2 on the image display 22. In this embodiment, the image processor 4021, position information controller 4023 and image synthesizer 4022 of the document camera 400, which perform in a manner similar to those illustrated in the embodiment of FIG. 2, may be integrated into a single chip and functions as a digital signal processor (DSP) 402. The DSP 402 is disposed between the video-capturing module 401 and DAC 403 for processing the image obtained by the video-capturing module 401 into a desired format as described above with reference to FIG. 3 and then having the processed image shown on the image display 22 via the DAC 403.

To sum up, as the image synthesizer and the position information controller are arranged in a document camera according to the present invention, the document camera can exhibit a zoom-indication function with a contracted overlay image in addition to the display of the target image. Furthermore, a mark frame superimposes a specific area of the contracted overlay image for indicating which part of the target image is currently shown. It is particularly advantageous when a zoom-in operation is performed, and facilitates subsequent panning operations While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A document camera for showing image of an object on an image display, comprising:

a video-capturing device for picking up an initial image of the object to realize a first image data;

an image processor electrically connected to said video-capturing device for deriving a second image data and a third image data from said first image data in response to a zoom operation, wherein said second image data results in a zoomed image of the object and said third image data results in a scaled image of the object;

a position information controller electrically connected to said image processor for generating a mark frame data in response to said zoom operation, wherein said mark frame data results in a mark frame; and an image synthesizer electrically connected to said position information controller and said image processor for synthesizing said zoomed image, said scaled image and said mark frame to generate a combined image shown on the image display, wherein said mark frame superimposes said scaled image to indicate a result of said zoom operation.

2. The document camera according to claim 1 wherein said video-capturing device is a module comprising:

an image sensor for receiving and converting a light intensity reflected from the object into an analog signal; and an analog-to-digital converter for converting said analog signal into said first image data.

3. The document camera according to claim 1 wherein said first image data, said second image data, said third image data and said mark frame data include coordinates of respective start points on the image display.

4. The document camera according to claim 1 wherein said scaled image overlays a corner of said zoomed image, and said mark frame variably superimposes said scaled image according to the relationship between said zoomed image and said initial image.

5. The document camera according to claim 1 wherein said zoom operation is a zoom-in operation, said second image data is obtained according to a specified zoom-in ratio n, said third image data is obtained according to a specified contraction ratio m, and said mark frame data is obtained according to said specified zoom-in ratio n and said specified contraction ratio m.

6. The document camera according to claim 5 wherein said mark frame data includes position information and size information.

7. The document camera according to claim 6 wherein said position information and said size information correlate to the product m×n.

8. The document camera according to claim 1 further comprising a digital-to-analog converter electrically connected to said image synthesizer for converting said combined image data into an analog image data for display.

9. The document camera according to claim 1 wherein said image processor, said position information controller and said image synthesizer are integrated into a single chip.

* * * * *